United States Patent
Youngner et al.

(10) Patent No.: US 7,038,824 B2
(45) Date of Patent: May 2, 2006

(54) DYNAMIC REFLECTOR ARRAY AND METHOD OF MAKING THE SAME

(75) Inventors: Daniel W. Youngner, Maple Grove, MN (US); Eugen I. Cabuz, Edina, MN (US); Thomas R. Ohnstein, Roseville, MN (US); Paul E. Bauhahn, Fridley, MN (US)

(73) Assignee: Honeywell International Inc., Morristown, NJ (US)

( * ) Notice: Subject to any disclaimer, the term of this patent is extended or adjusted under 35 U.S.C. 154(b) by 163 days.

(21) Appl. No.: 10/716,341

(22) Filed: Nov. 18, 2003

(65) Prior Publication Data

US 2005/0105153 A1    May 19, 2005

(51) Int. Cl.
    *G02B 26/08* (2006.01)
(52) U.S. Cl. ...................................... 359/212
(58) Field of Classification Search ............. None
    See application file for complete search history.

(56) References Cited

U.S. PATENT DOCUMENTS

| | | |
|---|---|---|
| 4,762,426 A | 8/1988 | Foss |
| 5,180,623 A | 1/1993 | Ohnstein |
| 5,244,537 A | 9/1993 | Ohnstein |
| 5,355,241 A | 10/1994 | Kelley |
| 5,583,507 A | 12/1996 | D'Isepo et al. |
| 5,836,750 A | 11/1998 | Cabuz |
| 6,106,245 A | 8/2000 | Cabuz |
| 6,137,623 A | 10/2000 | Roberson et al. |
| 6,184,607 B1 | 2/2001 | Cabuz et al. |
| 6,184,608 B1 | 2/2001 | Cabuz et al. |
| 6,211,580 B1 | 4/2001 | Cabuz et al. |
| 6,215,211 B1 | 4/2001 | Harris et al. |
| 6,233,088 B1 | 5/2001 | Roberson et al. |
| 6,240,944 B1 | 6/2001 | Ohnstein et al. |
| 6,255,758 B1 | 7/2001 | Cabuz et al. |
| 6,288,472 B1 | 9/2001 | Cabuz et al. |
| 6,351,054 B1 | 2/2002 | Cabuz et al. |
| 6,392,221 B1 | 5/2002 | Aksyuk et al. |
| 2001/0047846 A1 | 12/2001 | Currens et al. |

OTHER PUBLICATIONS

3M Scotchlite™ "Very High Gain Sheeting" 2000X, Technical Information.
3M Scotch® "Cube Corner Reflectors" 100 & SCCR Series, Technical Data Jun., 2003.

*Primary Examiner*—Euncha P. Cherry
(74) *Attorney, Agent, or Firm*—Honeywell International (57) ABSTRACT

A dynamic micro-structured reflector includes a substrate having a generally planar major surface and a plurality of cavities on the planar major surface. Each cavity having at least a first and second sidewalls set at an angle offset from the planar major surface. The first sidewall being a stationary optical face and the second sidewall being a dynamic optical face. The dynamic optical face is deflectable between a first position and a second position. The dynamic optical face in the first position redirects more light back to a light source than the dynamic optical face in the second position. Methods of making a dynamic micro-structured reflector are also disclosed.

23 Claims, 8 Drawing Sheets

DYNAMIC REFLECTOR ARRAY AND METHOD OF MAKING THE SAME

FIELD OF THE INVENTION

The present invention relates generally to the field of dynamic reflectors. More specifically, the present invention pertains to micro-structured dynamic optical reflectors.

BACKGROUND OF THE INVENTION

Retroreflectors are known devices which are often used as transponders. Retroreflectors receive light and reflect the light back in the direction from whence it came. A passive retroreflector returns light with the same general characteristics of the incident light, preferably with relatively high directional gain and relatively little spreading of the incident light beam. In contrast, an active retroreflector may include an emitting device that can generate a user definable signal in response to the incident radiation beam.

Retroreflectors have found a wide variety of applications in numerous fields including communications systems, monitoring systems, and in-flight refueling systems. Examples of different types of retroreflector structures include a corner-cube reflector, a horn reflector, a parabolic dish reflector, and a parabolic cylinder reflector.

Another application of retroreflectors is in the task of identifying friend-or-foe (IFF) in a battleground setting. Since the evolution of weaponry which allowed opposing forces to fight through the exchange of the instrumentalities of war at a distance, fratricide killing has been a problem. IFF tasks are a delicate comprise between secure, ambiguous identification and the maintenance of stealth positions. In typical IFF systems, a radio or microwave frequency request is made by an interrogation unit such as a plane or tank and a corresponding signal is returned by the targeted unit. This is normally achieved by a transponder on the targeted unit that emits a coded return signal when the interrogation request is received. Other systems merely re-radiate or reflect the incident interrogation request, while some systems modulate the re-radiated or reflected signal in an distinctive manner. The interrogation unit then deciphers the received signal to determine if the targeted unit is a friend or foe. However, by emitting (i.e., reflecting) a broadly directed response that is designed to have a sufficient strength to reach the interrogation unit, some of the radiation may be detected by other units of the opposing force which may reveal the position of the targeted unit.

SUMMARY OF THE INVENTION

Generally, the present invention pertains to micro-structured dynamic optical reflectors.

In one illustrative embodiment, a dynamic micro-structured reflector includes a substrate having a generally planar major surface and a plurality of cavities on the planar major surface. Each cavity has at least a first and second sidewalls set at an angle offset from the planar major surface. The first sidewall is a stationary optical face and the second sidewall is a dynamic optical face. The dynamic optical face is deflectable between a first position and a second position. The dynamic optical face in the first position redirects more light back to a light source than the dynamic optical face in the second position.

In another illustrative embodiment, a dynamic micro-structured reflector includes a plurality of cube-corner elements forming a cube-corner array. Each cube-corner element has two stationary optical faces and one dynamic optical face. The dynamic optical face is deflectable between a first position and a second position. The dynamic optical face in the first position redirects more light back to a light source than the dynamic optical face in the second position.

In a further illustrative embodiment, a method of making a dynamic micro-structured reflector includes the steps of: depositing a first conducting layer on a substrate having a generally planar major surface and a plurality of cavities on the planar major surface, each cavity having at least a first and second sidewalls set at an angle offset from the planar major surface; patterning the first conducting layer to form a lower electrode on each first sidewall and adjacent portion of the major planar surface; depositing a first dielectric layer on the lower electrode and the substrate; depositing and patterning a sacrificial layer on the first sidewall first dielectric layer; depositing a second dielectric layer on the sacrificial layer and first dielectric layer; depositing a second conducting layer on the second dielectric layer; patterning the second conducting layer to form an upper electrode over each lower electrode; depositing a third dielectric layer on the upper electrode and the second dielectric layer; depositing a reflecting layer on the first and second sidewall third dielectric layer; forming a hole through the second and third dielectric layers to expose a portion of the sacrificial layer; and removing the sacrificial layer to form a dynamic optical face being deflectable between a first position and a second position and a portion of the dynamic optical face being spaced away from the first dielectric layer a first distance in second position. The dynamic optical face in the first position redirects more light back to a light source than the dynamic optical face in the second position.

The above summary of the present invention is not intended to describe each disclosed embodiment or every implementation of the present invention. The Figures, Detailed Description and Examples which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE INVENTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

Generally, the present invention pertains to dynamic reflectors such as, micro-structured dynamic optical reflectors. While the present invention is not so limited, an appreciation of various aspects of the invention will be gained through a discussion of the examples provided below.

For the following defined terms, these definitions shall be applied, unless a different definition is given in the claims or elsewhere in this specification.

As used in this specification and the appended claims, the singular forms "a", "an", and "the" include plural referents unless the content clearly dictates otherwise. Thus, for example, reference to a "schedule parameter" includes a two or more schedule parameters. As used in this specification and the appended claims, the term "or" is generally employed in its sense including "and/or" unless the content clearly dictates otherwise.

Figure 1:
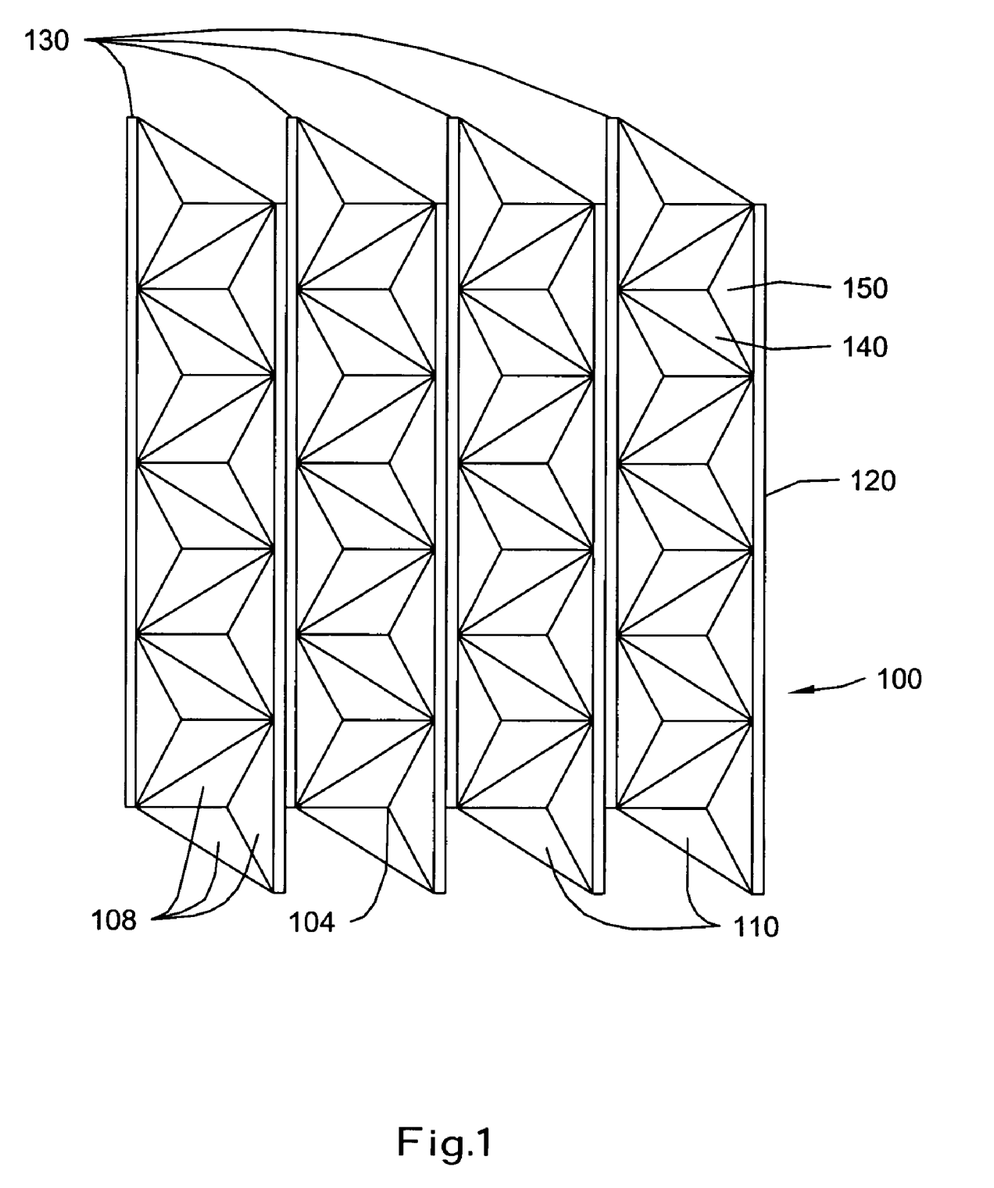
FIG. 1 is a top view of an array of cube-corner elements according to an embodiment of the invention.

FIG. 1 is a top view of an array 100 of cube-corner elements 110 according to an embodiment of the invention. The cube-corner elements 110 can be disposed on a substrate 120 having a planar major surface. The cube-corner elements 110 form cavities on substrate 120 major planar surface. In the illustrative embodiment, each element 110 is in the shape of a tetrahedral prism that has three exposed optical faces 108 and an inverted apex 104. The optical faces of the cube-corner elements define a micro-structured surface. Each element 110 can have a stationary optical face 140 and a dynamic optical face 150. The array 100 is configured to retro-reflect light incident light. The array 100 can modify the amount of incident light that is retro-reflected in a dynamic manner as described below.

In some embodiments, the substrate 120 can include electronics 130 to control the position of some or all of the dynamic optical faces 150. The dynamic optical faces 150 can be controlled in unison or separately as desired. The dynamic optical face 150 can be deflectable between a first position and a second position. In this embodiment, the dynamic optical face 150 in the first (e.g., low) position redirects more optical light back to a light source than the dynamic optical face 150 in the second (e.g., upper) position. As used herein, the first position can be a position that redirects more light back to the light source or the second position can be a position that redirects more light back to the light source. The dynamic optical face 150 actuates from a first position to a second position or from a second position to a first position. In either case the dynamic optical face actuates to or from a position that redirects more light back to the light source.

Figure 2:
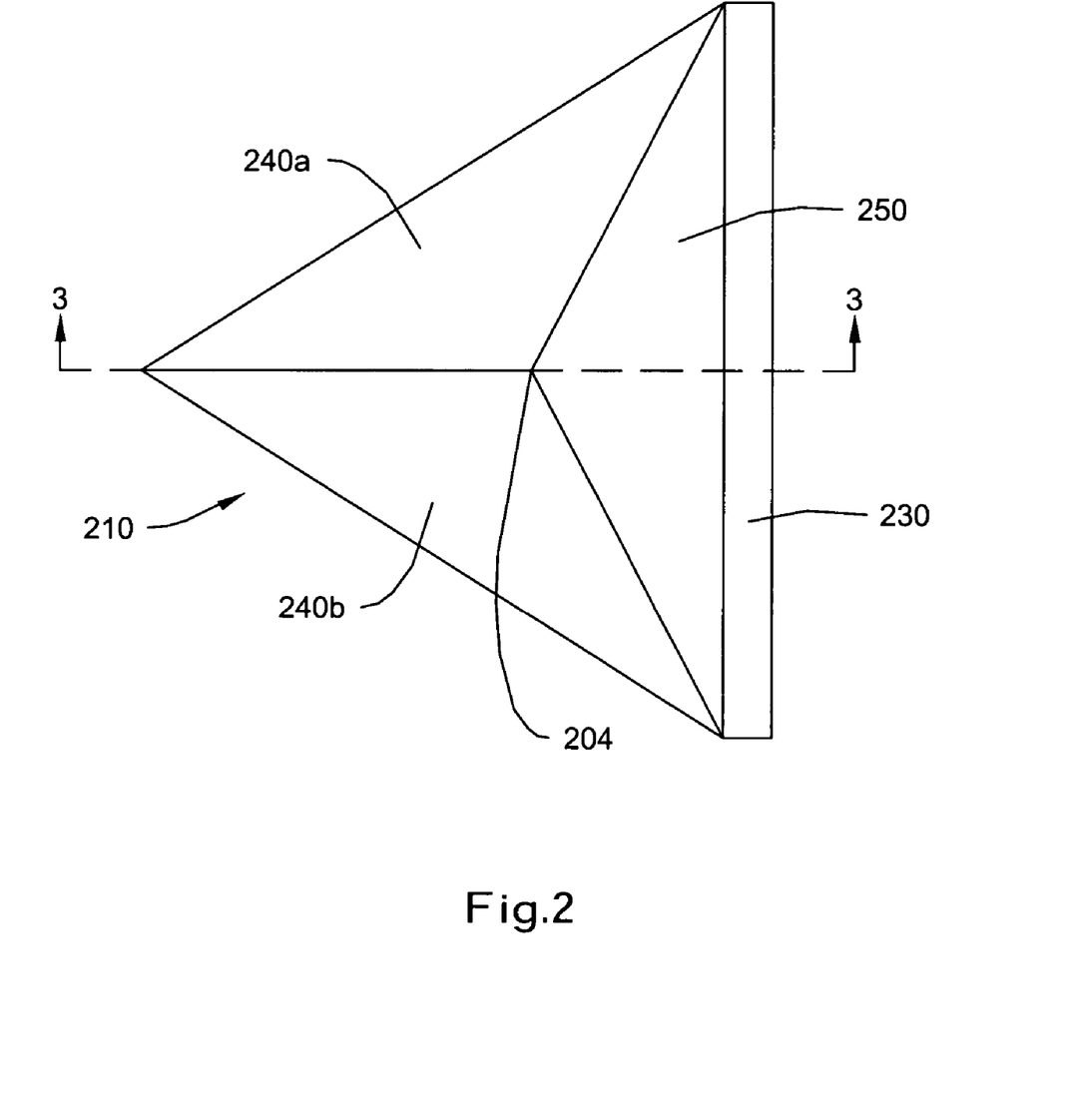
FIG. 2 is a top view of a single cube-corner reflecting element shown in FIG. 1.

FIG. 2 is a top view of a single cube-corner reflecting element 210 shown in FIG. 1. In the illustrative embodiment, each element 210 is in the shape of a tetrahedral prism that has three exposed optical faces 240A, 240B, 250 and an inverted apex 204. Each element 210 can have a stationary optical face 240A, 240B and a dynamic optical face 250. In the illustrative embodiment, the element 210 can include electronics 230 to control the position of the dynamic optical face 250.

Figure 3A:
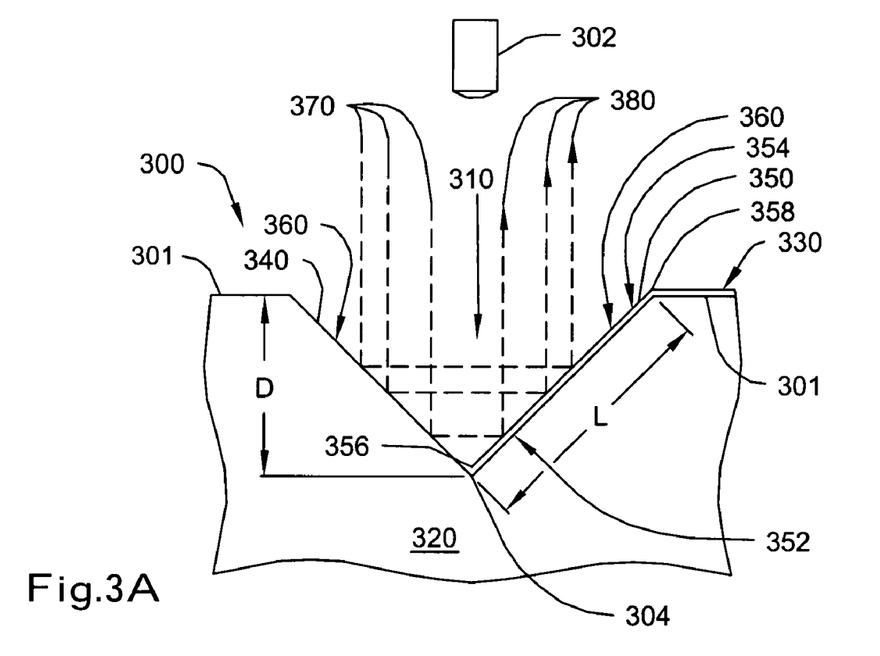
FIG. 3A is a cross-sectional side view of FIG. 2 across line 3—3 in an "ON" state.
Figure 3B:
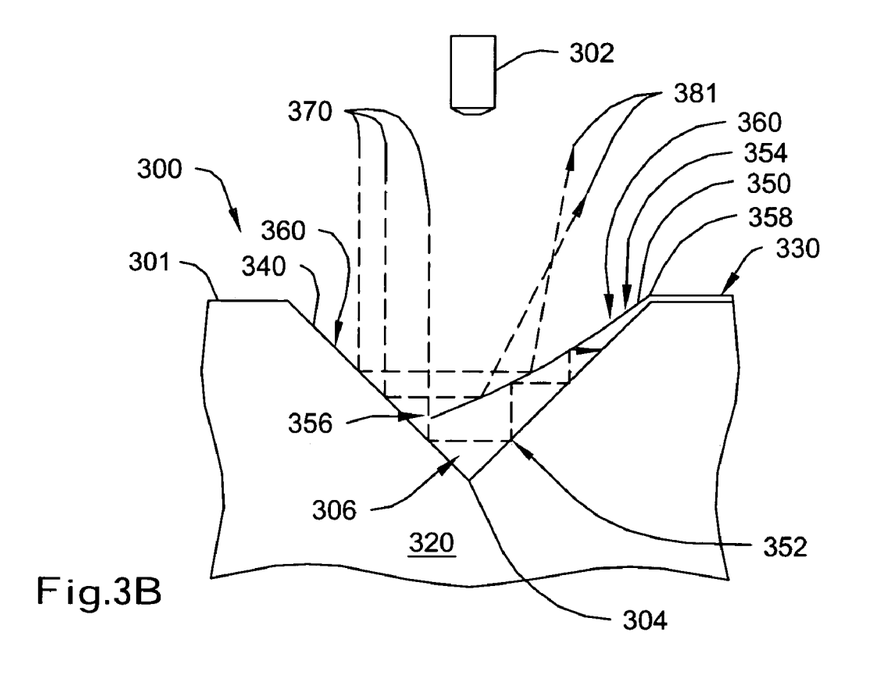
FIG. 3B is a cross-sectional side view of FIG. 2 across line 3—3 in an "OFF" state.

FIG. 3 is a cross-sectional side view of the element 210 shown in FIG. 2 across line 3—3 in an "ON" state 300. With regard to FIG. 3A and FIG. 3B, the element 310 forms a cavity or depression on the substrate 320 major planar surface 301. Two optical faces 340, 350 are shown meeting at an inverted apex 304. The element 310 has a stationary optical face 340 and a dynamic optical face 350. In the illustrative embodiment, a portion of, or substantially the entire surface of the dynamic optical face 350, is deflectable relative to the stationary optical face 340.

A reflective layer 360 can be disposed on the stationary optical face 340 and the dynamic optical face 350. The reflective layer 360 can be specularly reflective. The reflective layer 360 can be metallic. Suitable materials for use as reflective layer 360 can include any suitable reflective material or composite material, for example, aluminum, gold, silver, tin and combinations thereof. In some embodiments, the reflective layer may be any suitable thickness such as, for example, between 100 to 1200 nm thick.

The element 310 has a depth "D" equal to the distance from the major planar surface 301 to the inverted apex 304. In some embodiments, depth "D" is between 10 microns and 100 microns. In other embodiment, depth "D" is between 30 microns to 50 microns. However, it is recognized that depth "D" may be any suitable dimension, depending on the application.

The dynamic optical face 350 has a length "L" equal to the distance from the major planar surface 301 to the inverted apex 304. In some embodiments, length "L" is between 10 microns to 100 microns. In other embodiments, length "L" is between 30 microns to 50 microns. However, it is recognized that length "L" may be any suitable dimension, depending on the application.

The dynamic optical face 350 can have a lower electrode 352 on, adjacent to, or in the substrate 320, extending along at least a portion of the length "L" of the dynamic optical face 350. The dynamic optical face 350 can have an upper electrode 354 adjacent to the lower electrode 352, which may also extend along, at least a portion of, the length "L" of the dynamic optical face 350. The upper electrode 354 can have a fixed end 358 and an opposing free end 356. In some embodiments, the fixed end 358 can be affixed at or near the substrate 320 major planar surface 301, and the free end 356 can be movable at or near the inverted apex 304.

With regard to FIG. 3A, when voltage sufficient is applied across the upper electrode 354 and lower electrode 352, the free end 356 deflects from a second "OFF" position to a first "ON" position under an electrostatic force. FIG. 3A shows the free end 356 in the first "ON" position. The first "ON" position configures the dynamic optical face 350 to cooperate with the stationary optical face 340 redirecting a larger amount of incident optical light 370 from a light source 302, into reflected light 380 directed in a path parallel to the incident optical light 370 path and back to the light source 302.

FIG. 3B is a cross-sectional side view of FIG. 2 across line 3—3 in an "OFF" state. When the voltage is removed across the upper electrode 354 and lower electrode 352, the free end 356 deflects from a first "ON" position to a second "OFF" position. FIG. 3B shows the free end 356 in the second "OFF" position. The second "OFF" position configures the dynamic optical face 350 to cooperate with the stationary optical face 340 redirecting a large amount of incident optical light 370 from a light source 302, into reflected light 381 directed into paths non-parallel to the incident optical light 370 path and away from the light source 302. The dynamic optical face 350 free end 356 deflects away from the inverted apex 304 creating an air gap 306 between the free end 356 and the apex 304 and/or lower electrode 352. In some embodiments, the air gap 306 can be from 2 microns to 10 microns, or 2 microns to 5 microns, but any suitable gap may be utilized.

Figure 4:
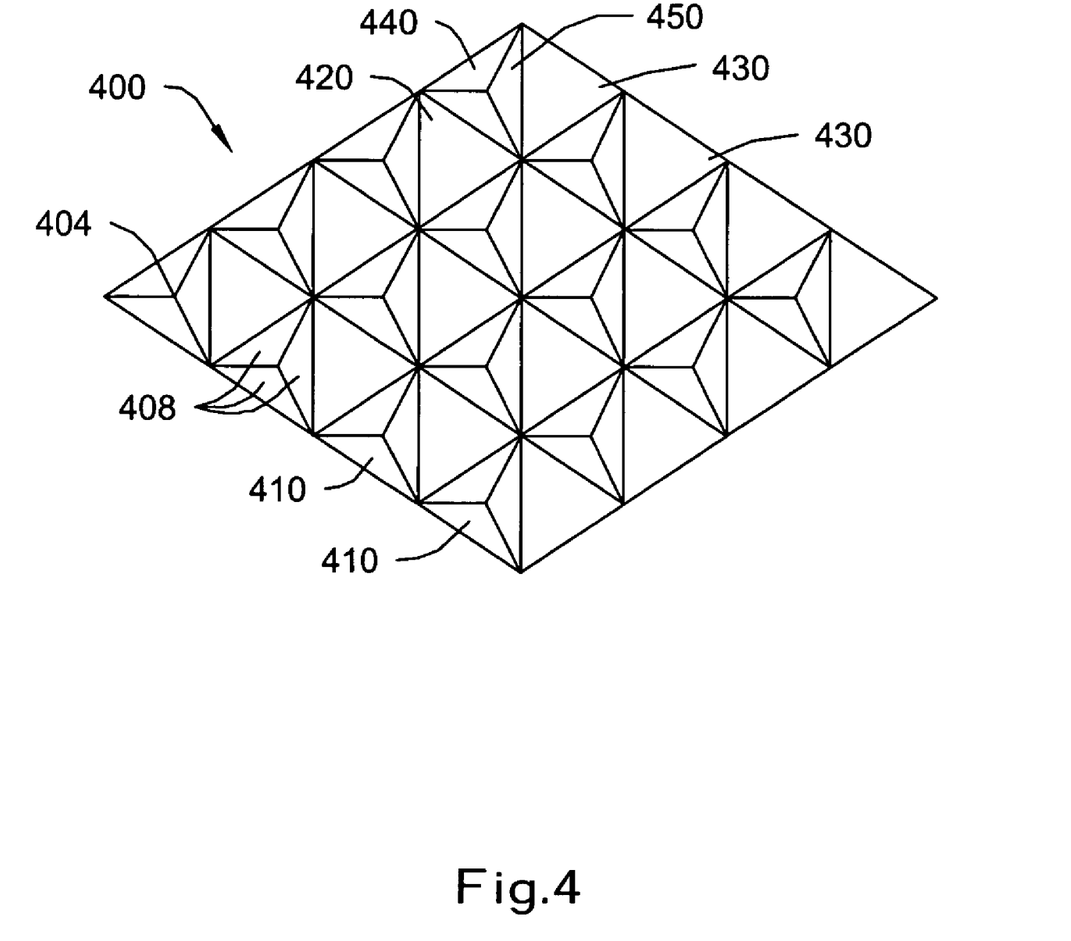
FIG. 4 is a top view of an array of cube-corner elements according to an embodiment of the invention.

FIG. 4 is a top view of an array 400 of cube-corner elements 410. The cube-corner elements 410 can be disposed on a substrate 420 having a planar major surface. In the illustrative embodiment, the cube-corner elements 410 form cavities on substrate 420 major planar surface. Each element 410 is in the shape of a tetrahedral prism that has three exposed optical faces 408 and an inverted apex 404. The optical faces of the cube-corner elements define a micro-structured surface. Each element 410 can have a stationary optical face 440 and a dynamic optical face 450. The array 400 is configured to retro-reflect incident light, and can modify the amount of incident light that is retro-reflected in a dynamic manner as described below.

In some embodiments, the substrate 420 can include electronics 430 that can control the position of the dynamic optical faces 450. The dynamic optical faces 450 can be controlled in unison or operate separately, as desired. As shown below, the dynamic optical face 450 can be deflectable between a first position (e.g., lower) and a second position (e.g., upper), where the dynamic optical face 450 redirects more optical light back to a light source in the first position than in the second position.

Figure 5:
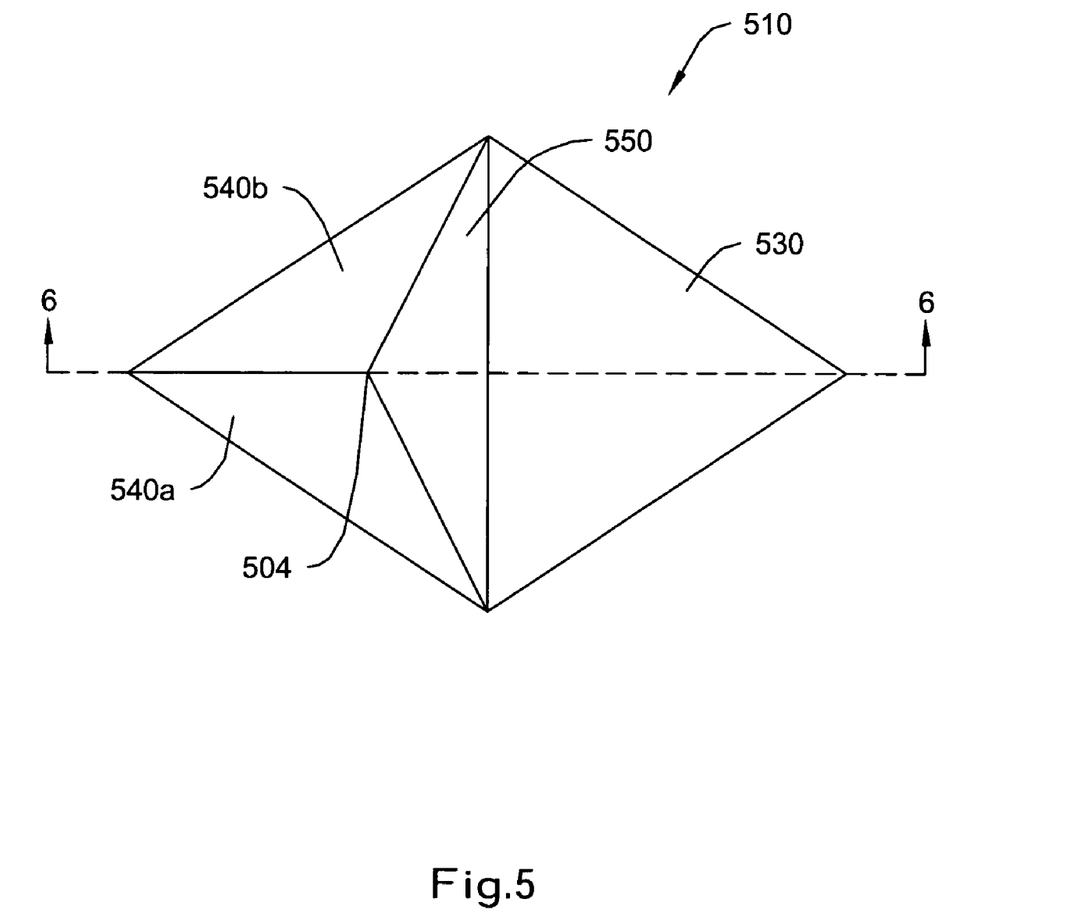
FIG. 5 is a top view of a single cube-corner reflecting element shown in FIG. 4.

FIG. 5 is a top view of a single cube-corner reflecting element 510 shown in FIG. 4. Each element 510 is in the shape of a tetrahedral prism that has three exposed optical faces 540A, 540B, 550 and an inverted apex 504. In the illustrative embodiment, each element 510 can have a stationary optical face 540A, 540B and a dynamic optical face 550. In some embodiments, the element 510 can include electronics 530 to control the position of the dynamic optical face 550, but this is not required in all embodiments.

Figure 6A:
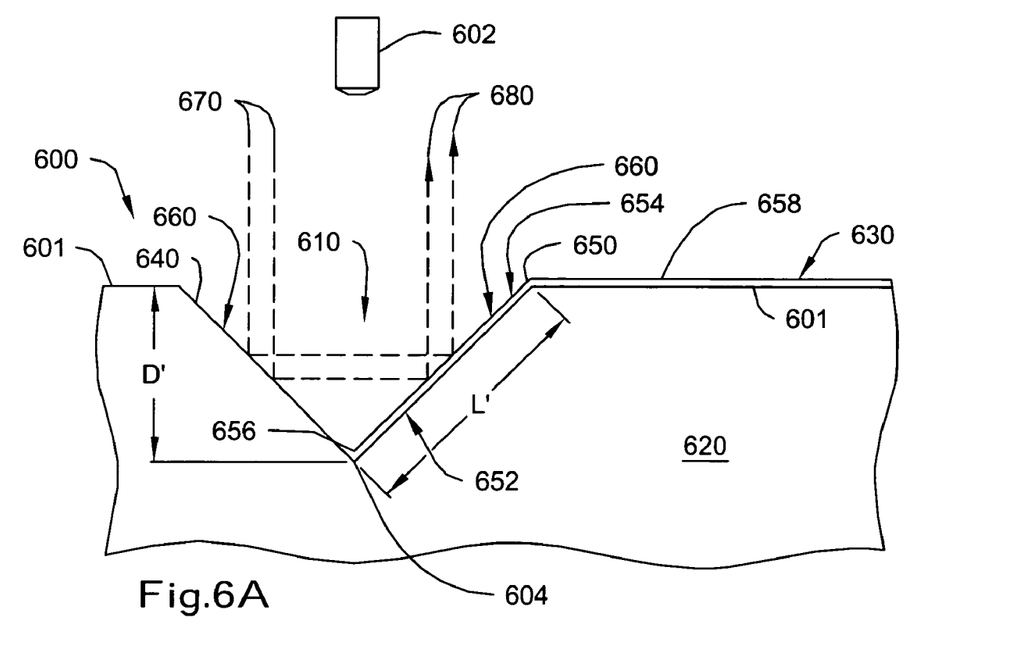
FIG. 6A is a cross-sectional side view of FIG. 5 across line 6—6 in an "ON" state.

FIG. 6A is a cross-sectional side view of the element 510 shown in FIG. 2 across line 6—6 in an "ON" state 600. With regard to FIG. 6A and FIG. 6B, the element 610 forms a cavity or depression on the substrate 620 major planar surface 601. Two optical faces 640, 650 are shown meeting at an inverted apex 604. The element 610 has a stationary optical face 640 and a dynamic optical face 650. A portion of, or substantially the entire surface of the dynamic optical face 650 can be deflectable relative to the stationary optical face 640.

Figure 6B:
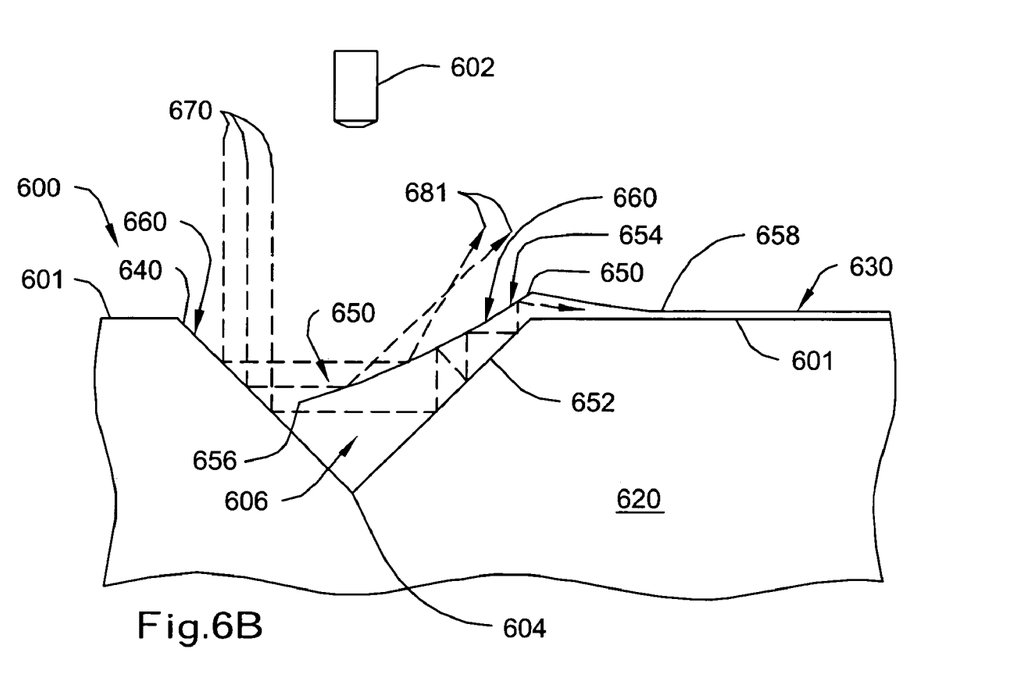
FIG. 6B is a cross-sectional side view of FIG. 5 across line 6—6 in an "OFF" state.

A reflective layer 660 can be disposed, or otherwise provided on the stationary optical face 640 and dynamic optical face 650. The reflective layer 660 can be specularly reflective. The reflective layer 660 can be metallic. Suitable materials for use as reflective layer 360 can include any suitable reflective material or composite material, for example, aluminum, gold, silver, tin and combinations thereof. The reflective layer can be any suitable thickness such as, for example, between 500 and 1200 nm thick.

The element 610 has a depth d equal to the distance from the major planar surface 601 to the inverted apex 604. In some embodiments, depth "D'" is between 10 microns and 100 microns. In other embodiments, depth "D'" is between 30 microns and 50 microns. However, it is recognized that depth "D'" may be any suitable dimension, depending on application.

The dynamic optical face 650 has a length "L'" equal to the distance from the major planar surface 601 to the inverted apex 604. In some embodiments, length "L'" is between 10 microns and 100 microns. In other embodiments, length "L'" is between 30 microns and 50 microns. However, it is recognized that length "L'" may be any suitable dimension, depending on application.

The dynamic optical face 650 can have a lower electrode 652 on, adjacent to, or in the substrate 620, extending along at least a portion of the length "L'" of the dynamic optical face 650. The dynamic optical face 650 can have an upper electrode 654 adjacent to the lower electrode 652, which may also extend along at least a portion of the length "L'" of the dynamic optical face 650. The upper electrode 654 can have a fixed end 658 and an opposing free end 656. In some embodiments, the fixed end 658 can be affixed at or near the substrate 620 major planar surface 601, and the free end 656 can be movable at or near the inverted apex 604.

With regard to FIG. 6A, when sufficient voltage is applied across the upper electrode 654 and lower electrode 652, the free end 656 deflects from a second "OFF" position to a first "ON" position under an electrostatic force. FIG. 6A shows the free end 656 in the first "ON" position. The first "ON" position configures the dynamic optical face 650 to cooperate with the stationary optical face 640 redirecting a larger amount of incident optical light 670 from a light source 602, into reflected light 680 directed in a path parallel to the incident optical light 670 path and back to the light source 602.

FIG. 6B is a cross-sectional side view of FIG. 5 across line 6-6 in an "OFF" state. When the voltage is removed across the upper electrode 654 and lower electrode 652, the free end 656 deflects from a first "ON" position to a second "OFF" position. FIG. 6B shows the free end 656 in the second "OFF" position. The second "OFF" position configures the dynamic optical face 650 to cooperate with the stationary optical face 640 redirecting a large amount of incident optical light 670 from a light source 602, into reflected light 681 directed into paths non-parallel to the incident optical light 670 path and away from the light source 602. The dynamic optical face 650 free end 656 deflects away from the inverted apex 604 creating an air gap 606 between the free end 656 and the apex 604 and/or lower electrode 652. In some embodiments, the air gap 606 can be from 2 microns to 10 microns, or 2 microns to 5 microns, but any suitable air gap can be used.

Figure 7A:
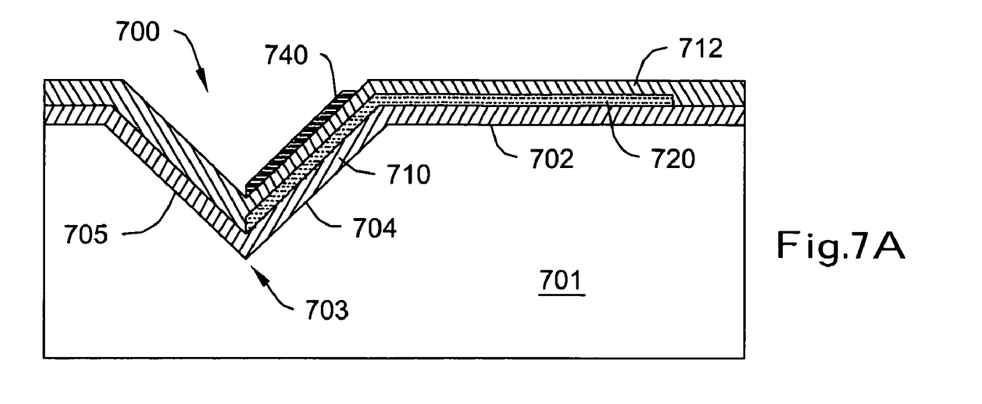
FIG. 7A is a cross-sectional side view of dynamic micro-structured reflector at a stage of fabrication where a sacrificial layer has been deposited on a lower electrode.

FIG. 7A is a cross-sectional side view of a dynamic micro-structured reflector 700 at a stage of fabrication where a sacrificial layer 740 has been deposited on a lower electrode 720, which has been deposited on a dielectric layer 710. The substrate 701 is a micro-structured article that can have a generally planar major surface 702 and a plurality of cavities 703. Each cavity 703 can have at least a first 704 and second 705 sidewall set at an angle offset from the planar major surface 702. In an illustrative embodiment, the substrate 701 has a prismatic micro-structured surface, such as a cube-corner micro-structured surface. For example, an illustrative cube-corner micro-structured substrate 701 is commercially available from the 3M Company (St. Paul, Minn.) under the trade name 3000X.

A first or lower conducting layer 720 can be deposited on the substrate 701 or dielectric layer 710. In some embodiments, the substrate 701 can be a dielectric material. First or lower conducting layer 720 can be patterned to form a lower electrode 720 on the first sidewall 704 and a portion of the major planar surface 702. A dielectric layer 712 can then be deposited on the lower electrode 720. A sacrificial layer 740 can be deposited and patterned on the dielectric layer 712 above the lower electrode 720 and the first sidewall 704. The sacrificial layer 740 will be removed later in the processing, as described below.

The sacrificial layer 740 serves as a spacer between the lower electrode 720 and the upper electrode 722 (to be formed) so that when it is removed later in the process, the upper electrode 722 will be released and free to move. The sacrificial layer 740 can be any material, than can be deposited, patterned, and later selectively removed with an etch that does not attack the other films exposed during the etch. Examples of sacrificial layers that can be used are aluminum, molybdenum, polyimide, silicon dioxide, and the like. The sacrificial layer 740 can be any suitable thickness such as, for example, 250 to 1000 angstroms.

Figure 7B:
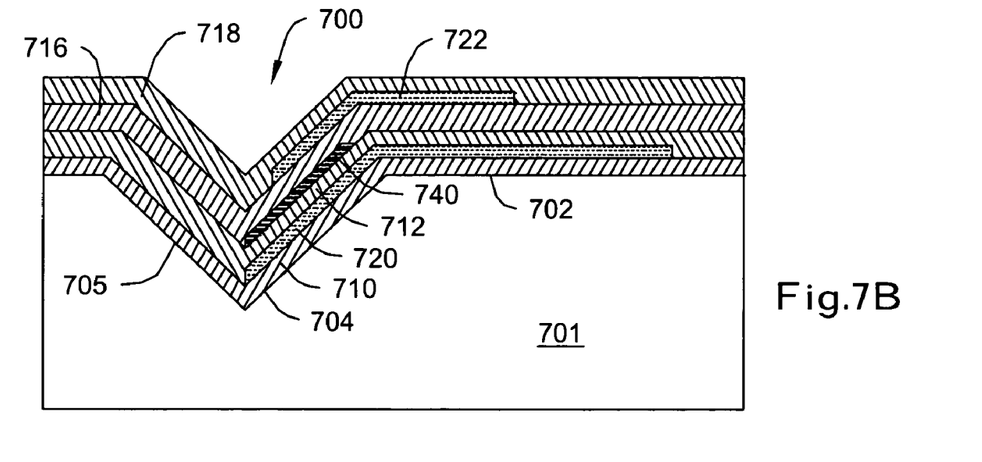
FIG. 7B is a cross-sectional side view of dynamic micro-structured reflector at a stage of fabrication where a top electrode has been deposited.

FIG. 7B is a cross-sectional side view of dynamic micro-structured reflector 700 at a stage of fabrication where a top electrode 722 has been deposited. A dielectric layer 716 can be deposited on the lower electrode 720 dielectric layer 712 and the sacrificial layer 740. A conducting layer 722 then can be patterned to form an upper electrode 722 on the first sidewall 704 and a portion of the major planar surface 702 above the lower electrode 720. A dielectric layer 718 can be deposited on the upper electrode 722. Hence, the lower electrode 720 and the upper electrode 722 are encapsulated by dielectric material to electrically isolate the lower electrode 720 from the upper electrode 722.

The dielectric layers 710, 712, 716, 718 can be any suitable electrically insulating material such as, for example, silicon nitride, silicon oxide, polyimide, and the like. The dielectric layers 710, 712, 716, 718 can be any suitable thickness such as, for example, 0.5 to 1 micron. The electrode layers 720, 722 can be any electrically conducting material such as, for example, chrome, aluminum, gold, silver, and the like. The electrode layers 720, 722 can be any suitable thickness such as, for example, 500 to 1000 angstroms.

Figure 7C:
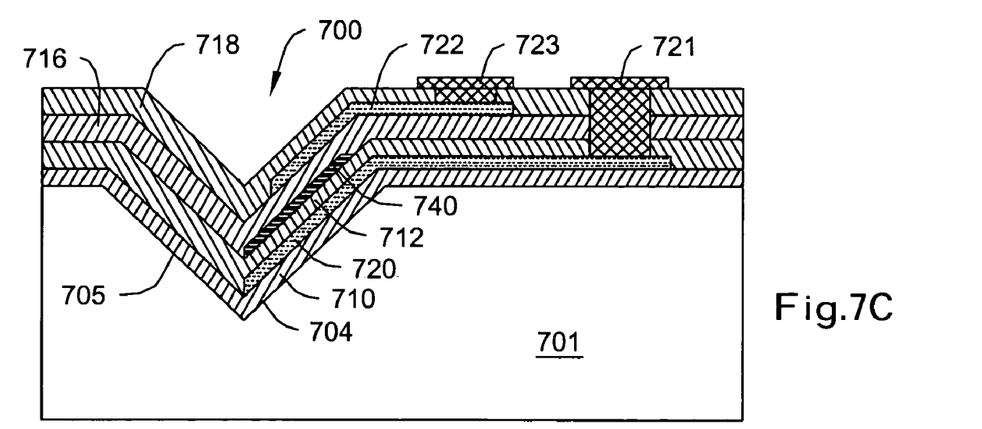
FIG. 7C is a cross-sectional side view of dynamic microstructured reflector at a stage of fabrication where contact pads have been deposited.

FIG. 7C is a cross-sectional side view of dynamic micro-structured reflector 700 at a stage of fabrication where contact pads 721, 723 have been deposited. Vias are formed and contact pads 721, 723 are deposited into the vias to form connections to the lower electrode 720 and the upper electrode 722. The contact pads 721, 723 can be any suitable conductive material such as gold. The contact pads 721, 723 can be any suitable thickness such as, for example, 250 to 1000 angstroms of chrome followed by 0.5 to 1 micron of gold.

Figure 7D:
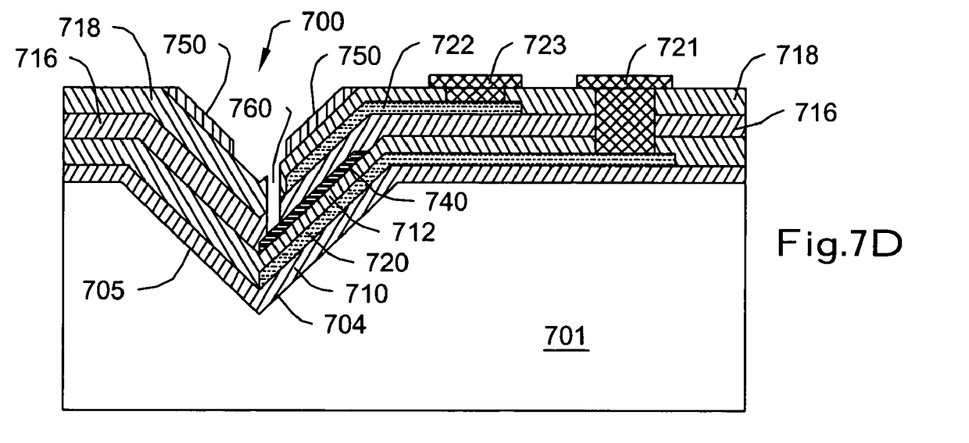
FIG. 7D is a cross-sectional side view of dynamic microstructured reflector at a stage of fabrication where a reflective layer has been deposited and a via has been formed to the sacrificial layer.

FIG. 7D is a cross-sectional side view of dynamic micro-structured reflector 700 at a stage of fabrication where a reflective layer 750 has been deposited and a hole 760 has been formed to intersect the sacrificial layer 740. A reflecting layer 750 is deposited and patterned onto the top dielectric layer 718 on the first sidewall 704 and second sidewall 705. The reflecting layer 750 can be specularly reflective as described above. A hole 760 can be formed through the dielectric layers 716, 718 over the sacrificial layer 740 to expose a portion of the sacrificial layer 740. The hole 760 provides an opening to remove the sacrificial layer 740.

Figure 7E:
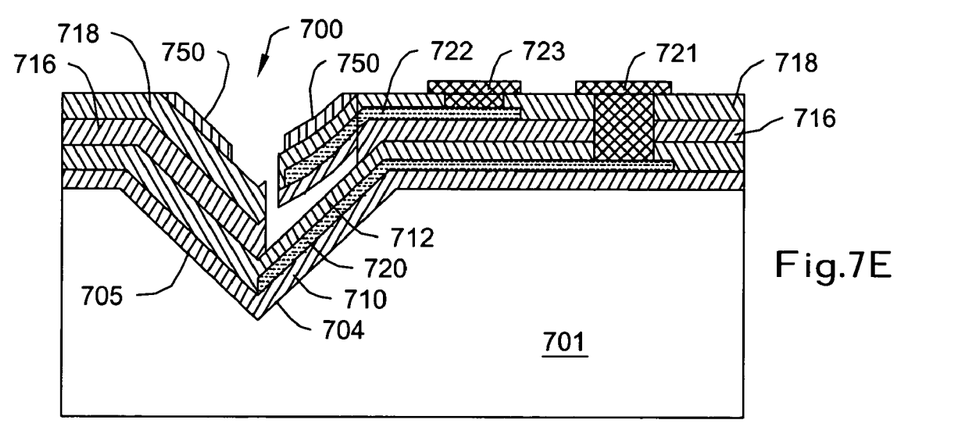
FIG. 7E is a cross-sectional side view of dynamic microstructured reflector at a stage of fabrication where the sacrificial layer has been removed and in the "OFF" state.

FIG. 7E is a cross-sectional side view of dynamic micro-structured reflector 700 at a stage of fabrication where the sacrificial layer 740 has been removed and in the "OFF" state. The sacrificial layer 740 can be selectively removed with a selective etch such as a wet etch or a dry plasma etch. Once the sacrificial layer 740 is removed, the upper electrode 722 can be configured and arranged so that residual stress in the upper electrode 722 structure will cause it to curve away from the lower electrode 720 when released. This is the "OFF" state of the device, where the upper electrode 722 is not allowing optical light to retro-reflect back to a light source.

Figure 7F:
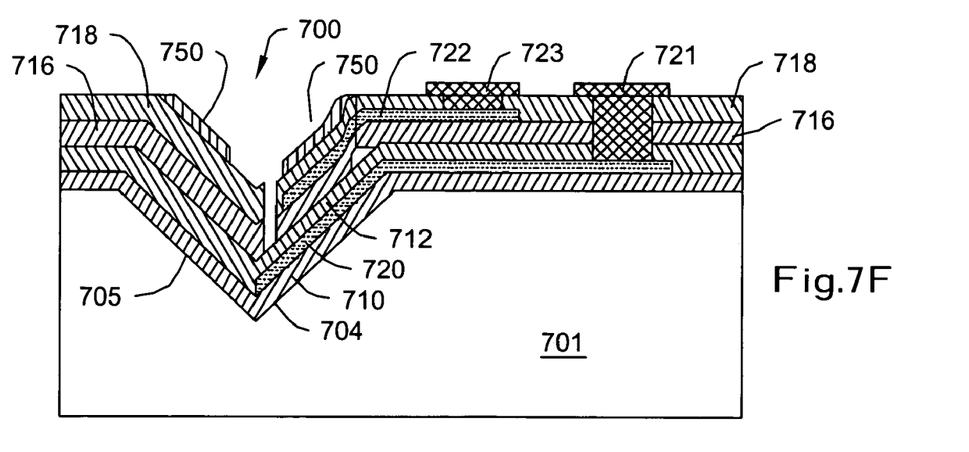
FIG. 7F is a cross-sectional side view of dynamic microstructured reflector in the "ON" state.

FIG. 7F is a cross-sectional side view of dynamic micro-structured reflector 700 in the "ON" state. Applying a voltage between the upper electrode 722 and lower electrode 720 operates the dynamic reflector 700, attracting the upper electrode 722 to the lower electrode 720 via electrostatic forces. The electrostatic force pulls the upper electrode 722 against the lower electrode 720 (with dielectric material between them) allowing the reflective surface 750 on the upper electrode 722 to cooperate with the reflective surface 750 on the second sidewall 705 to retro-reflect incident optical light back to the light source. The upper electrode 722 can be modulated between open and closed positions.

The present invention should not be considered limited to the particular examples described above, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

What is claimed is:

1. A dynamic micro-structured reflector comprising:
   a substrate having a generally planar major surface; and
   a plurality of cavities on the planar major surface, each cavity having at least a first and second sidewalls set at an angle offset from the planar major surface, the first sidewall being a stationary optical face and the second sidewall being a dynamic optical face, the dynamic optical face being deflectable between a first position and a second position;
   wherein, the dynamic optical face in the first position redirects more light back to a light source than the dynamic optical face in the second position.

2. The dynamic micro-structured reflector according to claim 1, wherein the dynamic optical face is electrostatically actuated between the first position and the second position.

3. The dynamic micro-structured reflector according to claim 1, wherein substantially the entire dynamic optical face deflects between the first position and the second position.

4. The dynamic micro-structured reflector according to claim 1, wherein each cavity has a depth of 10 microns to 100 microns.

5. The dynamic micro-structured reflector according to claim 1, wherein each cavity has a depth of 30 microns to 50 microns.

6. The dynamic micro-structured reflector according to claim 1, wherein the cavity is a cube-corner structure having two stationary optical faces and the dynamic optical face.

7. The dynamic micro-structured reflector according to claim 1, wherein the each dynamic optical face is electrically coupled together.

8. A dynamic micro-structured reflector comprising:
a plurality of cube-corner elements forming a cube-corner array, each cube-corner element having two stationary optical faces and one dynamic optical face, the dynamic optical face being deflectable between a first position and a second position,
wherein, the dynamic optical face in the first position redirects more light back to a light source than the dynamic optical face in the second position.

9. The dynamic micro-structured reflector according to claim 8, wherein the dynamic optical face is electrostatically actuated between the second position and the first position.

10. The dynamic micro-structured reflector according to claim 8, wherein substantially the entire dynamic optical face deflects between the first position and the second position.

11. The dynamic micro-structured reflector according to claim 8, wherein each cube-corner element has a depth of 10 microns to 100 microns.

12. The dynamic micro-structured reflector according to claim 8, wherein each cube-corner element has a depth of 30 microns to 50 microns.

13. The dynamic micro-structured reflector according to claim 8, wherein the cube-corner array is formed in a planar substrate.

14. A dynamic micro-structured reflector assembly comprising:
a plurality of cube-corner elements forming a cube-corner army, each cube-corner element having two stationary optical faces and one dynamic optical face, the dynamic optical face being deflectable between a first position and a second position, wherein, the dynamic optical face in the first position redirects more light back to a light source than the dynamic optical face in the second position; and
electronics electrically coupled to the plurality of cube corners elements to control the position of at least a portion of the plurality dynamic optical faces of the cube-corner array.

15. The dynamic micro-structured reflector assembly according to claim 14, wherein the dynamic optical face is electrostatically actuated between the second position and the first position by the electronics.

16. The dynamic micro-structured reflector assembly according to claim 14, wherein substantially the entire dynamic optical face deflects between the first position and the second position.

17. The dynamic micro-structured reflector assembly according to claim 14, wherein each cube-corner element has a depth of 10 microns to 100 microns.

18. The dynamic micro-structured reflector assembly according to claim 14, wherein each cube-corner element has a depth of 30 microns to 50 microns.

19. The dynamic micro-structured reflector assembly according to claim 14, wherein the cube-corner array is formed in a planar substrate.

20. The dynamic micro-structured reflector assembly according to claim 14, wherein the electronics control only a portion of the plurality of dynamic optical faces of the cube-corner array.

21. The dynamic micro-structured reflector assembly according to claim 14, wherein the electronics control all of the plurality of dynamic optical faces of the cube-corner array.

22. The dynamic micro-structured reflector assembly according to claim 14, wherein the electronics control all of the plurality of dynamic optical faces of the cube-corner array seperately.

23. The dynamic micro-structured reflector assembly according to claim 14, wherein the electronics control all of the plurality of dynamic optical faces of the cube-corner array in unison.

* * * * *